United States Patent
Capdepon et al.

(10) Patent No.: US 11,490,634 B2
(45) Date of Patent: Nov. 8, 2022

(54) METHOD AND COMPOSITION FOR THE PREPARATION OF GELATIN BASED GUMMY CANDIES

(71) Applicant: ROUSSELOT B.V., Son (NL)

(72) Inventors: Claude Capdepon, Neuville en Ferrain (FR); Ivo Jozef Georges Simonne Verheye, Vinkt (BE); Paul Stevens, Ghent (BE)

(73) Assignee: ROUSSELOT B.V., Son (NL)

( * ) Notice: Subject to any disclaimer, the term of this patent is extended or adjusted under 35 U.S.C. 154(b) by 241 days.

(21) Appl. No.: 16/478,365

(22) PCT Filed: Jan. 19, 2018

(86) PCT No.: PCT/EP2018/051335
§ 371 (c)(1),
(2) Date: Jul. 16, 2019

(87) PCT Pub. No.: WO2018/134365
PCT Pub. Date: Jul. 26, 2018

(65) Prior Publication Data
US 2019/0364924 A1 Dec. 5, 2019

(30) Foreign Application Priority Data

Jan. 20, 2017 (EP) .................................... 17152484

(51) Int. Cl.
*A23G 3/44* (2006.01)
*A23G 3/34* (2006.01)
*A23G 3/42* (2006.01)

(52) U.S. Cl.
CPC ............. *A23G 3/44* (2013.01); *A23G 3/0034* (2013.01); *A23G 3/42* (2013.01)

(58) Field of Classification Search
CPC .......... A23G 3/44; A23G 3/0034; A23G 3/42; A23L 29/20; A23L 29/281; A23L 29/284; A23V 2200/228
USPC ................................................ 426/573, 656
See application file for complete search history.

(56) References Cited

U.S. PATENT DOCUMENTS

| | | |
|---|---|---|
| 1,540,979 A | 6/1925 | Bloom |
| 2,119,699 A | 6/1938 | Bloom |
| 3,943,265 A * | 3/1976 | Steensen ............... A23L 29/284 426/576 |
| 2002/0197356 A1 | 12/2002 | Katz |
| 2006/0198930 A1 | 9/2006 | Royo et al. |
| 2014/0328992 A1 | 11/2014 | Guilleaume et al. |
| 2015/0216199 A1 | 8/2015 | Porter et al. |
| 2016/0089332 A1 | 3/2016 | Kitanaka et al. |
| 2016/0198930 A1 | 7/2016 | Galban et al. |

FOREIGN PATENT DOCUMENTS

| | | |
|---|---|---|
| JP | 2002-540129 A | 11/2002 |
| JP | 2012-170424 A | 9/2012 |
| JP | 2012-231694 A | 11/2012 |
| JP | 2014-226050 A | 12/2014 |
| WO | WO 2000/057842 A2 | 10/2000 |
| WO | WO 2017/102347 A1 | 6/2017 |

OTHER PUBLICATIONS

Less and Jackson, "Sugar Confectionery and chocolate manufacture", 1973, Leonard Hill Books, Pertinent pp. 86-89. (Year: 1973).*
International Search Report and Written Opinion in related PCT Application No. PCT/EP2018/051335, dated Mar. 7, 2018, 11 pages.
International Preliminary Report on Patentability in related PCT Application No. PCT/EP2018/051335, dated Jul. 23, 2019, 8 pages.
Spellee's main initiative; Summary thereof; Brief Recipes of Keisha Yakuji Recipes; General foundational Juridicial educe Research Institute; Japan Co., Ltd.; Jan. 5, 2016.

* cited by examiner

*Primary Examiner* — Jyoti Chawla
(74) *Attorney, Agent, or Firm* — Lathrop GPM LLP; James H. Velema; Judith L. Stone-Hulslander

(57) ABSTRACT

The invention describes a method for the preparation of gelatin based gummy candies, wherein a liquid candy composition comprising gelatin, bulking agent and water is casted in a mold and allowed to set to provide the gelatin based gummy candies, and the gelatin based gummy candies are removed from the mold. The liquid candy composition comprises, based on the total weight of the composition, 20 w/w % or less water, and the mold is not capable of absorbing water from the liquid candy composition, and at least a portion of the mold that is in contact with the liquid candy composition is resilient. A liquid candy composition suitable to be casted in such a mold and capable to form gelatin based gummy candies upon setting therein is described.

18 Claims, No Drawings

METHOD AND COMPOSITION FOR THE PREPARATION OF GELATIN BASED GUMMY CANDIES

RELATED APPLICATIONS

This application is a 35 U.S.C. § 371 filing of International Patent Application No. PCT/EP2018/051335, filed Jan. 19, 2018, which claims priority to European Patent Application No. 17152484.6, filed Jan. 20, 2017, the entire disclosures of which are hereby incorporated herein by reference.

The invention relates to a method and a composition for the preparation of gelatin based gummy candies.

In the art, gelatin based gummy candies are known, and are resilient, soft, gelatin containing candies, such as gummy bears (Haribo, Germany) and jelly babies (Bassetts, UK). As such gummy candies usually have a fruit taste, they are also known as fruit gum candy. Such candies are prepared by casting a liquid candy composition comprising gelatin, bulking agent and water in a mold, whereafter the liquid composition is allowed to set to provide the gummy candies, which are subsequently removed from the mold.

Today, the liquid candy composition is casted in a starch mold, a long and laborious casting method. Herein, dry starch powder has to be flattened in a casting container, and the envisaged forms of the candy has to be pressed into the starch to provide the mold. Subsequently, a liquid candy composition is casted in the mold and allowed to set typically at ambient temperature during 24 hours. While being in the mold, the starch absorbs a significant amount of water present in the liquid candy composition. After setting, the candy is removed from the mold. Thereby, the starch loses its shape, so that for a second round of casting, the starch has to be dried, flattened again and the forms have to be pressed in the dried starch material. Further disadvantages of starch molds are that cross contamination of food products can occur, and that a drying chamber needs to be included in an industrial process for producing such gelatin based gummy candies.

Although alternative casting methods are known, e.g. using molds of resilient water repellant material, known in the art for use as molds for e.g. ice cubes or cakes. Such molds are usually made from plastics, like silicone or polytetrafluorethylene (PTFE), or plastics coated with such a water repellant material. Such molds, such as silicone molds have however not been suitable for the preparation of gelatin based gummy candies. The liquid composition tends not to set, or results in a product that does not have the required gum-like, i.e. resilient texture and bite. In confectionery, such silicone molds have hitherto been used limitatively for cakes and hard candy, candy based on pectin, wherein the pectin content is at least about 2 w/w %. Advantages of using resilient, water repellent molds such as silicone molds are that they can immediately be reused and do not require a drying and/or pressing step such as starch molds.

Alternatively, resilient water repellant molds are described in combination with a drying step in order to reduce the water content of the liquid composition and letting it set properly. Such drying step however is undesirable as it is time and/or energy consuming.

For example, US2016089332 describes a gel-like composition in which ubiquinol is dispersed and methods of making these compositions. This document further describes that the gel-like composition can be processed into a gummy candy like shape, and prepared by pouring into a mold which may be silicone. A preferred mold however is starch based and in any case the liquid is dried to the desired moist level.

US2002197356 describes gummy like soft candies for use in ice cream products and methods of making these. The described final moisture percentage of the product is 25%, while the document only describes the use of starch molds.

US2015216199 describes gummy products with a high protein content and methods of making these. The method requires a drying step and the use of a starch mold.

US2006198930 describes jelly (gummy) candy with a liquid filling and method for making these. The methods described therein also require a drying step in which the moist content is reduced.

Therefore known methods of generating gelatin based candy all require either a drying step or the use of a single use starch mold to extract moist from the liquid composition, or a combination thereof. This problem has surprisingly been overcome be the methods and compositions as detailed in the appended claims.

SUMMARY OF THE INVENTION

To overcome, amongst others, the above problems, the present invention relates to a method for the preparation of gelatin based gummy candies, comprising the steps of:
1) providing a liquid candy composition comprising gelatin, bulking agent and water, that forms, upon setting in a mold, the gelatin based gummy candies,
2) casting the liquid candy composition in a mold,
3) allowing the liquid candy composition to set, to provide the gelatin based gummy candies,
4) removing the gelatin based gummy candies, obtained in step 3) from the mold,
wherein the liquid candy composition of step 1) comprises, based on the total weight of the composition, 20 w/w % or less water, the mold not being capable of absorbing water from the liquid candy composition during steps 2) and 3), at least a portion of the mold that is in contact with the liquid candy composition during steps 2) and 3) being resilient, and wherein the water content of the liquid candy composition is substantially the same as the water content of the gummy candy of the final product.

Preferably, in the method of the invention steps 2), 3) and 4) do not involve a drying step. In a more preferred embodiment of the invention the setting of step 3) is performed at a temperature below 25° C., preferably at a temperature below 10° C., more preferably at a temperature below 4° C. In a further embodiment, in the method of the invention the setting step 3) takes one hour or less, preferably 30 minutes or less, more preferably 10 minutes or less. In a further embodiment, in the method of the invention the resilient portion of the mold comprises shape memory material, preferably silicone. In a further embodiment, in the method of the invention the mold is made of silicone. In a further embodiment, in the method of the invention the liquid candy composition comprises, based on the total weight of the composition, 5-15 w/w %, preferably 6-12 w/w %, more preferably 7-10 w/w % most preferably 7-9 w/w % gelatin. In a further embodiment, in the method of the invention the gelatin in the liquid candy composition has a bloom value of 200 to 300, preferably of 225 to 280 more preferably of 225 to 250. In a further embodiment, in the method of the invention the liquid candy composition comprises, based on the total weight of the composition, up to 1 w/w % pectin, preferably 0.1-0.7 w/w %, more preferably 0.2-0.5 w/w %, and most preferably 0.3-0.4 w/w % pectin. In a further embodiment, in the method of the invention the liquid candy composition comprises, based on the total weight of the composition, 13-20 w/w %, preferably 18-19 w/w % water. In a further embodiment, in the method of the invention the dry weight of the bulking agent is 60-79 w/w % of the total weight of the liquid candy composition. In a further embodiment, in the method of the invention the bulking agent comprises a sweetener. the sweetener preferably being chosen from the group, consisting of sugars and polyols or a combination thereof. In a further preferred embodiment, in the method of the invention the bulking agent comprises sucrose or corn syrup or a combination thereof. In a further embodiment, in the method of the invention the weight ratio sucrose:corn syrup, based on dry weight, is 1:1. In a further embodiment, in the method of the invention the liquid candy composition comprises, based on the total weight of the composition, 0.5-5 w/w % of a pH modulating agent, the pH modulating agent preferably comprising an acid, preferably citric acid. In a further embodiment, in the method of the invention the pH of the liquid candy composition is between 2.8 and 3.5. In a further embodiment, in the method of the invention the liquid candy composition comprises one or more additives, chosen from the group, consisting of flavoring agents, coloring agents.

The invention further relates to a liquid candy composition as defined by the method of the invention.

DETAILED DESCRIPTION OF THE INVENTION

It has now been found that gelatin based gummy candies can be produced using molds of resilient water repellent material, such as silicone molds, which are relatively inert and can be reused over and over again without drying or reshaping being necessary. To this end, a method is provided according to the main claim. Herein, a liquid candy composition is provided that already contains the water content of the final product when set, i.e. a water content of 20 w/w % or lower. The composition is preferably a solution, wherein the gelatin, and preferably the other ingredients as well are dissolved. The skilled person is familiar with the fact that it is preferred to heat the water, e.g. to 70-90° C. in order to allow the gelatin to dissolve. However, some gelatins are known that dissolve at ambient temperature. In the art, the liquid candy composition comprises over 20 w/w % water, e.g. up to 25 w/w % water. When casted in starch, it is observed that by water absorption by the starch, the water content decreases to 20 w/w % or below, to arrive at a final product with the required texture and bite.

In the method described herein, the mold is not capable of absorbing water from the liquid candy composition when casted and allowed to set in the mold, and at least a portion of the mold that is in contact with the liquid candy composition during casting and setting is resilient, allowing simple removal of the set candy from the mold. To this end, the resilient portion of the mold preferably comprises shape memory material, so that the candy, once set, can be pressed out of the mold, the mold allowing to get back in it original shape. As described above, the mold thereto preferably comprises a water repellant resilient material, such as a suitable plastic. Preferably, the resilient mold portion comprises silicone or PTFE, in particular silicone. More preferably the mold is made of said material, in particular silicone. As indicated above, silicone, but also PTFE, is a very suitable material for molds, as it can have a shape memory, and does not absorb water from the casting liquid.

In the method described herein, the water content of the liquid candy composition is substantially the same as the water content of the gummy candy of the final product. Substantially the same water content in the context of the present invention should be interpreted as no drying step is performed as defined below, and thus minimal to no water is lost from the liquid candy composition. It should be noted that minor amounts of naturally occurring evaporation may still occur during the steps, however such evaporation should not be considered drying steps as defined below. Particularly the method of the invention does not comprise any active steps of promoting evaporation such as a drying step. In a preferred embodiment, the water content of the liquid candy composition is the same as the water content of the gummy candy of the final product.

Preferably, steps 2), 3) and 4) do not involve a drying step. For the purpose of this invention a drying step is defined as one or a combination of:

Letting the composition set for 90 minutes or more in order to increase loss of water content through evaporation; and/or Increasing the temperature to 30° C. or higher in order to increase loss of water content through evaporation; and/or Using a mold capable of extracting water content from the liquid candy composition, such as a starch mold, in order to reduce the water content of the liquid candy composition.

Therefore, preferably in the method according to the invention the setting step 3) is performed at 25° C. or less, and/or setting step 3) takes one hour or less, and/or mold used in steps 2) to 4) is not capable of absorbing water, for example by using a silicone mold.

In another preferred embodiment of the invention, no action is taken aimed at reducing the water content of the composition, such as increasing the temperature to promote water evaporation from the liquid candy composition, increasing the time spend in the mold to promote water evaporation from the liquid candy composition, reducing moisture levels of the surrounding in order to increase evaporation of water of the liquid candy composition, or using molds that are capable of absorbing water from the composition thereby reducing water content of the liquid candy composition.

Preferably the setting of step 3) is performed at a temperature below 25° C., more preferably at a temperature below 10° C., even more preferably at a temperature below 4° C. Preferably the setting step 3) takes one hour or less, more preferably 30 minutes or less, even more preferably 10 minutes or less.

As defined herein, liquid candy composition is a liquid composition comprising gelatin which has not gelled yet. This liquid candy composition may remain liquid by keeping the composition at elevated temperatures thereby preventing setting (gelling) form a gel, which in the context of the invention is not considered a liquid candy composition.

The liquid candy composition preferably comprises, based on the total weight of the composition, 5-15 w/w % gelatin. Gelatin is a mixture of water soluble proteins, derived from collagen. Gelatin is obtained e.g. by partial hydrolysis of collagen, obtained by aqueous extraction of animal skin, tendons, ligaments, bones etc. in acid or alkali (lime) conditions or by an enzymatic process. Gelatin obtained by acid treatment is called Type A gelatin, whereas Type B gelatin is derived from alkali treatment. Currently, gelatin is mainly produced from bovine, porcine, fish and poultry. Gelatin is commonly used as gelling agent in food, pharmaceuticals and cosmetics. Below 5%, the product sets slowly, and once set, the product is soft and does not have than optimal gummy texture and bite. Above 15 w/w % gelatin, the product is hard and does not have the optimal gummy texture and bite. Accordingly, the liquid candy composition preferably comprises, based on the total weight of the composition, 6-12 w/w % gelatin, more preferably 7-10 w/w % gelatin, even more preferably 7-9 w/w % gelatin.

The strength of a gelatin gel can be determined by a Bloom gelometer, and is indicated by a Bloom number. The test was originally developed in 1925 by O. T. Bloom (U.S. Pat. Nos. 1,540,979 and 2,119,699). The test determines the weight (in grams) needed by a probe (normally with a diameter of 0.5 inch) to deflect the surface of the gel 4 mm without breaking it. The result is expressed in Bloom (grades). It is usually between 30 and 325 Bloom. The higher the Bloom number, the stronger the gel. To perform the Bloom test on gelatin, a 6.67% gelatin solution is made at 60° C., then kept for 17-18 hours at 10° C. prior to being tested. The term 'Low Bloom' reflects a Bloom number of 50-150, whereas 'Medium Bloom' reflects a Bloom number of 150-225, and 'High Bloom' reflects a Bloom number of 225-325. In the liquid candy composition, the gelatin preferably has a bloom value of 200 to 300. Such gelatin results in candy with optimal texture and bite. The skilled person knows that a gelatin of lower bloom will set slower than a gelatin with higher bloom when used in the same concentration, and that a gelatin solution of higher concentration will set faster than a more diluted solution. So the skilled person is very well capable to vary in both the gelatin concentration and the choice of the gelatin starting material, in particular regarding the bloom value thereof, to arrive at a liquid candy composition with the envisaged setting time, resulting in the envisaged bite and texture of the set product. To this end, the bloom value of the gelatin is preferably 225-280 or even more preferably 225-250. By using gelatin of this bloom value, the above amounts of gelatin, in particular 7-9 w/w % gelatin can be included in the candy composition to arrive at the envisaged texture and bite of the set gummy candy, and allowing for a rather fast setting time of about 10 to 30 minutes at 4° C., although good result may also be obtained at ambient temperatures like room temperature, for example between 20° C. and 25° C. A relatively fast setting time is of importance for manufacture of the gummy candy in an automatic casting process. To this end, the temperature during setting is preferably kept below 25° C., more preferably below 10° C., even more preferably below 5° C., such as 3-4° C.

Especially good results are obtained with the method of the invention when the liquid candy composition comprises, based on the total weight of the composition, 5-15 w/w % gelatin, and wherein the gelatin in the liquid candy composition has a bloom value of 200 to 300, preferably a bloom value of 225 to 280 more preferably a bloom value of 225-250. A combination of a gelatin content in this range and bloom value allows for extra fast setting of the composition resulting in minimal water loss trough evaporation. Preferably the liquid candy composition comprises, based on the total weight of the composition, 6-12 w/w % gelatin, and wherein the gelatin in the liquid candy composition has a bloom value of 200 to 300, preferably a bloom value of 225 to 280 more preferably a bloom value of 225-250. More preferably the liquid candy composition comprises, based on the total weight of the composition, 7-10 w/w % gelatin, and wherein the gelatin in the liquid candy composition has a bloom value of 200 to 300, preferably a bloom value of 225 to 280 more preferably a bloom value of 225-250. Even more preferably the liquid candy composition comprises, based on the total weight of the composition, 7-9 w/w % gelatin, and wherein the gelatin in the liquid candy composition has a bloom value of 200 to 300, preferably a bloom value of 225 to 280 more preferably a bloom value of 225-250.

The liquid candy composition can comprise an additional hydrocolloid that is capable to gel in the mold, in order to provide for additional gelling strength. Examples of such hydrocolloids are agar, carrageenan, Arabic gum, alginate and starch, in particular pectin. In such a case, the amount of gelatin can be decreased accordingly. In an attractive embodiment, the liquid candy composition comprises 0-1 w/w % pectin, more preferably 0.1-0.7 w/w %, even more preferably 0.2-0.5 w/w % pectin, or 0.3-0.4 w/w % pectin. In the liquid candy composition, the amount of gelatin, on weight basis, is preferably more than the amount of pectin. The pectin is preferably of the high methylester (HM) type, having a DE of higher than 50 to allow optimal gelling.

The water content of the liquid candy composition is preferably between 13 and 20 w/w/%, or 15 w/w %-20 w/w %, or 16 w/w %-20 w/w %, more preferably 18-19 w/w %, based on the total weight of the composition. It is to be noted that water content, added in the composition as part of another ingredient, such as e.g. corn syrup, or a citric acid solution or the like, is included in the above mentioned range.

The liquid candy composition preferably comprises 60-79 w/w % bulking agent, based on the dry weight of the bulking agent and the total weight of the composition, respectively. Bulking agents are known in the art, such as e.g. sugars such as sucrose and dextrose, corn syrup, (hydrogenated) glucose syrup, polyhydric alcohols, maltodextrins, polydextrose, or other agents that are known to the skilled person to deliver bulking and texture properties e.g. like those of sugar. The envisaged sweetness of the final gelatin based gummy product can be obtained by the proper choice of one or more of the above bulking agents. If a sweet product is desired, the bulking agent preferably comprises a sweetener. The term 'sweeteners' intends to encompass bulking agents with sweetening power, e.g. such as sucrose or corn syrup. Also polyols having high sweetening power can be used, such as xylitol or maltitol. If the final gelatin based gummy should have a more savory taste, it can be contemplated to use polydextrose or another bulking agent that have less or no sweetening power, such as the polyol lactitol. Preferably, the sweetener is chosen from the group, consisting of sugars and polyols or a combination thereof. The bulking agent preferably comprises sucrose or corn syrup or a combination thereof. The weight ratio of sucrose:corn syrup based on dry weight is preferably 40-60:60-40, more preferably 45-55: 55-45, most preferably about 1:1. The term 'about' allows for 5% more or less of the given value, preferably 3%, more preferably 1%, most preferably 0%.

The liquid candy composition preferably comprises, based on the total weight of the composition, 0.5-5 w/w % of a pH modulating agent. The pH of gelatin based gummy candy is preferably in the acid range, as most of the envisaged flavors are pronounced in acid conditions, such as raspberry, orange, strawberry, pineapple and lemon. Therefore, the pH modulating agent preferably comprises an acid, more preferably citric acid. The pH of the liquid candy composition is between 2.8 and 3.5.

The liquid candy composition may attractively comprise one or more additives, chosen from the group, consisting of flavoring agents, coloring agents. To this end, it can be contemplated to confer additional sweetness by the addition additional sweeteners, e.g. with high sweetening power such as non-sugar sweeteners such as e.g. aspartame. The skilled person will be aware of suitable additives to include in the liquid candy composition.

The invention also relates to a liquid candy composition as defined above.

The invention will now be further described by way of the following non-limiting examples.

Preparation of Liquid Candy Composition for Gelatin Based Gummy Candy 1. 8 w/w % gelatin gummy candy
Gelatin Solution:

8 kg of gelatine prepared by lime treatment of bovine bones having a bloom value of 225 (225LB; Rousselot; Brazil) was dissolved in 13 kg freshly boiled water having a temperature of 90-95° C. This gelatine solution was kept at 80° C. during 30 minutes, re-homogenised and allowed to cool down to 60° C.

Sugar Mass:

37 kg sucrose (Suiker Extra FK K1; Tiense Suiker; Belgium) and 45 kg glucose syrup (6080; Roquette; France) were mixed with 12 kg water at ambient temperature (20-25° C.) and heated to 125° C. in an open pan, whereafter the sugar mass was cooled down to 80-100° C.

The gelatin solution was added to the cooled sugar mass, the obtained solution was homogenised and deaerated (removal of foam) at 60° C.

2.6 kg of a 50% solution of citric acid (Citric Acid Anhydrous; Jungbunzlauer; Switzerland) in water, 200 gram cherry flavour (PE16040; Metarom; France) and 200 gram red colour (209459IOP; IMCD; Belgium) were added to produce 100 kg liquid candy composition.

The obtained liquid composition wherein all ingredients were dissolved was deposited in food grade silicone moulds (SF025; Silikomart; Italy/purchased on www.cuisine-shop.fr) which had been oiled with panning oil (AB6901; Stearinerie Dubois; France).

The composition was allowed to set during 10 minutes at 3° C.; whereafter the molds are turned upside down followed by an additional cooling at 3° C. during 15 minutes.

The obtained gummies were removed from the molds, followed by coating with sucrose crystals (Suiker Extra FK K1; Tiense Suiker; Belgium).

2. 7% 95/5 gelatin/pectin gummy candy
Gelatin/Pectin Solution:

6.65 kg of gelatine derived from bovine hides with a bloom value of 250 (250H; Rousselot; France) and 0.35 kg HM Pectin (Genu Pectin 150USA-SAG type D, CP Kelco, US) were dissolved in 14 kg freshly boiled water having a temperature of 90-95° C. This gelatine/pectin solution was kept at 80° C. during 30 minutes, re-homogenised and kept at 80° C. prior to use.

Sugar Mass:

37 kg sucrose (Suiker Extra FK K1; Tiense Suiker; Belgium) and 45 kg glucose syrup (6080; Roquette; France) were mixed with 12 kg water at ambient temperature (20-25° C.) and heated to 125° C., whereafter the sugar mass was cooled down to 80-100° C.

The gelatin/pectin solution was added to the cooled sugar mass, the obtained solution was homogenised and deaerated (removal of foam) at 60° C.

2.6 kg of a 50% solution of citric acid (Citric Acid Anhydrous; Jungbunzlauer; Switzerland) in water, 200 gram cherry flavour (PE16040; Metarom; France) and 200 gram red colour (209459IOP; IMCD; Belgium) were added to produce 100 kg final liquid candy composition.

The obtained liquid composition wherein all ingredients were dissolved was deposited in food grade silicone moulds (SF025; Silikomart; Italy/purchased on www.cuisine-shop.fr) which had been oiled with panning oil (AB6901; Stearinerie Dubois; France).

The composition was allowed to set during 10 minutes at 3° C.; whereafter the molds are turned upside down followed by an additional cooling at 3° C. during 15 minutes.

The obtained gummies were removed from the molds, followed by coating with sucrose crystals (Suiker Extra FK K1; Tiense Suiker; Belgium).

The invention claimed is:

1. A method for the preparation of gelatin based gummy candies, comprising the steps of:
   1) providing a liquid candy composition comprising gelatin, bulking agent and water, that forms, upon setting in a mold, the gelatin based gummy candies,
   2) casting the liquid candy composition in a mold,
   3) allowing the liquid candy composition to set at a temperature below 25° C., to provide the gelatin based gummy candies,
   4) removing the gelatin based gummy candies, obtained in step 3) from the mold, wherein the liquid candy composition of step 1) comprises, based on the total weight of the composition, 20 w/w% or less water, the mold not being capable of absorbing water from the liquid candy composition during steps 2) and 3), at least a portion of the mold that is in contact with the liquid candy composition during steps 2) and 3) being a starchless mold, and wherein the water content of the liquid candy composition is substantially the same as the water content of the gummy candy of the final product, and wherein the method does not involve a drying step, the drying step being defined as one or a combination of:
   letting the composition set for 90 minutes or more in order to increase loss of water content through evaporation; and/or
   increasing the temperature to 30° C. or higher in order to increase loss of water content through evaporation during setting; and/or
   using a mold capable of extracting water content from the liquid candy composition, optionally a starch mold, in order to reduce the water content of the liquid candy composition.

2. The method according to claim 1, wherein the setting step 3) takes one hour or less.

3. The method according to claim 1, wherein the resilient portion of the mold comprises shape memory material, preferably silicone.

4. The method according to claim 1, wherein the mold is made of silicone.

5. The method according to claim 1, wherein the liquid candy composition comprises, based on the total weight of the composition, 5-15 w/w % gelatin.

6. The method according to claim 1, wherein the gelatin in the liquid candy composition has a bloom value of 200 to 300.

7. The method according to claim 1, wherein the liquid candy composition comprises, based on the total weight of the composition, up to 1 w/w % pectin.

8. The method according to claim 1, wherein the liquid candy composition comprises, based on the total weight of the composition, 13-20 w/w % water.

9. The method according to claim 1, wherein the dry weight of the bulking agent is 60-79 w/w % of the total weight of the liquid candy composition.

10. The method according to claim 1, wherein the bulking agent comprises a sweetener.

11. The method according to claim 1, wherein the bulking agent comprises sucrose or corn syrup or a combination thereof.

12. The method according to claim 11, wherein the weight ratio sucrose: corn syrup, based on dry weight, is 1:1.

13. The method according to claim 1, wherein the liquid candy composition comptises, based on the total weight of the composition, 0.5-5 w/w % of a pH modulating agent.

14. The method according to claim 1, wherein the pH of the liquid candy composition is between 2.8 and 3.5.

15. The method according to claim 1, wherein the liquid candy composition comprises one or more additives, chosen from the group, consisting of flavoring agents, coloring agents.

16. A liquid candy composition prepared according to the method of claim 1.

17. The method according to claim 1, wherein the setting of step 3) is performed at a temperature below 4° C.

18. The method according to claim 1, wherein the gelatin in the liquid candy composition has a bloom value of 22.5 to 250.

\* \* \* \* \*